(12) United States Patent
Zhang et al.

(10) Patent No.: US 10,611,204 B1
(45) Date of Patent: Apr. 7, 2020

(54) SYSTEMS AND METHODS FOR ADAPTING TRACTIVE ELEMENTS TO A DISABLING EVENT

(71) Applicant: Oshkosh Defense, LLC, Oshkosh, WI (US)

(72) Inventors: Ron Zhang, Oshkosh, WI (US); David Hansen, Oshkosh, WI (US); Deepak Shukla, Oshkosh, WI (US); Aaron Rositch, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 202 days.

(21) Appl. No.: 15/957,546

(22) Filed: Apr. 19, 2018

Related U.S. Application Data (60) Provisional application No. 62/491,999, filed on Apr. 28, 2017.

(51) Int. Cl.
*B60G 17/016* (2006.01)
*B60G 17/015* (2006.01)
*B60G 11/27* (2006.01)

(52) U.S. Cl.
CPC ........... *B60G 17/016* (2013.01); *B60G 11/27* (2013.01); *B60G 17/0155* (2013.01); *B60G 2800/914* (2013.01)

(58) Field of Classification Search
CPC .. B60G 17/016; B60G 11/27; B60G 17/0155; B60G 2800/914
See application file for complete search history.

(56) References Cited

U.S. PATENT DOCUMENTS

| | | | |
|---|---|---|---|
| 5,016,544 A * | 5/1991 | Woollam | B60F 1/043 105/215.2 |
| 5,171,121 A | 12/1992 | Smith et al. | |
| 7,302,320 B2 | 11/2007 | Nasr et al. | |
| 8,000,850 B2 | 8/2011 | Nasr et al. | |
| 8,333,390 B2 | 12/2012 | Linsmeier et al. | |
| 8,459,619 B2 | 6/2013 | Trinh et al. | |
| 8,465,025 B2 | 6/2013 | Venton-Walters et al. | |
| 8,596,648 B2 | 12/2013 | Venton-Walters et al. | |
| 8,764,029 B2 | 7/2014 | Venton-Walters et al. | |
| 8,801,017 B2 | 8/2014 | Ellifson et al. | |
| 8,821,130 B2 | 9/2014 | Venton-Walters et al. | |
| 8,876,133 B2 | 11/2014 | Ellifson | |
| 8,991,834 B2 | 3/2015 | Venton-Walters et al. | |
| 9,114,804 B1 | 8/2015 | Shukla et al. | |
| 9,127,738 B2 | 9/2015 | Ellifson et al. | |
| 9,132,736 B1 | 9/2015 | Shukla et al. | |

(Continued)

*Primary Examiner* — Faye M Fleming
(74) *Attorney, Agent, or Firm* — Foley & Lardner LLP (57) ABSTRACT

Systems and methods for controlling one or more tractive assemblies of a vehicle responsive to a disabling event. A sensor is arranged to detect one or more conditions of a tractive element indicative of the functionality of the tractive element. The sensor generates data corresponding to the detected conditions. The tractive element is coupled to a frame of the vehicle and configured to support a portion of the weight of the vehicle. When the tractive element is determined to not be functioning properly, control signal(s) for an actuator are generated to control a distance between the tractive element and the frame. The control signal(s) cause the tractive element to be effectively raised from a support surface for the vehicle.

20 Claims, 6 Drawing Sheets

(56) References Cited

U.S. PATENT DOCUMENTS

| | | |
|---|---|---|
| 9,174,686 B1 | 11/2015 | Messina et al. |
| 9,291,230 B2 | 3/2016 | Ellifson et al. |
| 9,303,715 B2 | 4/2016 | Dillman et al. |
| 9,327,576 B2 | 5/2016 | Ellifson |
| 9,376,102 B1 | 6/2016 | Shukla et al. |
| 9,428,042 B2 | 8/2016 | Morrow et al. |
| 9,452,750 B2 | 9/2016 | Shukla et al. |
| 9,581,153 B2 | 2/2017 | Venton-Walters et al. |
| 9,650,032 B2 | 5/2017 | Kotloski et al. |
| 9,651,120 B2 | 5/2017 | Morrow et al. |
| 9,656,659 B2 | 5/2017 | Shukla et al. |
| 9,688,112 B2 | 6/2017 | Venton-Walters et al. |
| 9,707,869 B1 | 7/2017 | Messina et al. |
| 9,765,841 B2 | 9/2017 | Ellifson et al. |
| 9,809,080 B2 | 11/2017 | Ellifson et al. |
| 9,821,789 B2 | 11/2017 | Shukla et al. |
| 9,908,520 B2 | 3/2018 | Shukla et al. |
| 9,944,145 B2 | 4/2018 | Dillman et al. |
| 9,970,515 B2 | 5/2018 | Morrow et al. |
| 10,029,555 B2 | 7/2018 | Kotloski et al. |
| 10,029,556 B2 | 7/2018 | Morrow et al. |
| 10,030,737 B2 | 7/2018 | Dillman et al. |
| 2014/0195115 A1* | 7/2014 | Muller .................. B60G 21/00 701/37 |
| 2018/0154728 A1* | 6/2018 | Giovanardi ............ B60G 17/04 |
| 2019/0036321 A1* | 1/2019 | Hu ........................ F02D 41/221 |

* cited by examiner

SYSTEMS AND METHODS FOR ADAPTING TRACTIVE ELEMENTS TO A DISABLING EVENT

CROSS-REFERENCE TO RELATED APPLICATION

This application claims the benefit of U.S. Provisional Application No. 62/491,999, filed Apr. 28, 2017, which is incorporated herein by reference in its entirety.

BACKGROUND

All vehicles have some form of tractive element. Some examples of tractive elements include tires, tracks, etc. These tractive elements permit the vehicle to traverse a support surface (e.g., the ground).

Vehicles may have limited ability to continue stable powered movement after a disabling event. In some situations, a disabling event prevents normal operation of the tractive element. Without the tractive element operating as intended, the vehicle may experience a total loss of stability that prevents further powered movement of the vehicle.

SUMMARY

According to one aspect of the present disclosure, a vehicle is disclosed. The vehicle includes a frame. The vehicle includes a first tractive assembly coupled to the frame. The first tractive assembly includes a first tractive element configured to support a portion of the weight of the vehicle on a support surface. The first tractive assembly also includes a first actuator operatively connected to the first tractive element and configured to control a distance of the first tractive element to the frame. The vehicle includes a second tractive assembly coupled to the frame. The second tractive assembly includes a second tractive element configured to contact the support surface, The second tractive assembly also includes a second actuator operatively connected to the second tractive element and configured to control a distance of the first tractive element to the frame. The vehicle also includes a primary driver configured to provide energy to drive the first tractive element and second tractive element to propel the vehicle. The vehicle also includes a controller operatively connected to the first actuator and the second actuator. The controller executes instructions stored on memory to determine that the second tractive element is not functioning properly. The controller executes instructions stored on memory to generate one or more control signals for at least one of the first actuator and the second actuator to raise the second tractive element with respect to the first tractive element and thereby effectively raise the second tractive element from the support surface responsive to the determination that the second tractive element is not functioning properly.

According to another aspect of the present disclosure, a tractive assembly for a vehicle is disclosed. The tractive assembly includes a tractive element configured to support a portion of the weight of the vehicle on a support surface. The tractive element is operatively connected to and configured to receive energy from a primary driver of the vehicle and thereby propel the vehicle. The tractive assembly includes a sensor arranged to generate data corresponding to the functionality of the tractive element. The tractive assembly includes an actuator operatively connected to the first tractive element and configured to control a distance of the first tractive element to a frame of the vehicle. The actuator causes the tractive element to be effectively raised from the support surface responsive to the sensor generating data indicative of the tractive element not functioning properly.

According to another aspect of the present disclosure, a method of controlling one or more tractive assemblies of a vehicle responsive to a disabling event is disclosed. The method includes receiving data from a sensor arranged to detect one or more conditions of a tractive element indicative of the functionality of the tractive element. The tractive element is coupled to a frame of the vehicle and configured to support a portion of the weight of the vehicle. The method includes determining, based on the received data, that the tractive element is not functioning properly. The method includes generating one or more control signals for an actuator arranged to control a distance between the tractive element and the frame responsive to determining the tractive element is not functioning properly. The one or more control signals cause the tractive element to be effectively raised from a support surface for the vehicle.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a vehicle includes various components that improve performance relative to traditional systems. In some situations, a disabling event (e.g., a blast event, loss of air pressure in a tire, etc.) prevents the normal operation of a tractive element of the vehicle. The vehicle includes various components that are configured to react to a disabling event and thereby permit the vehicle to continue operation.

Figure 1:
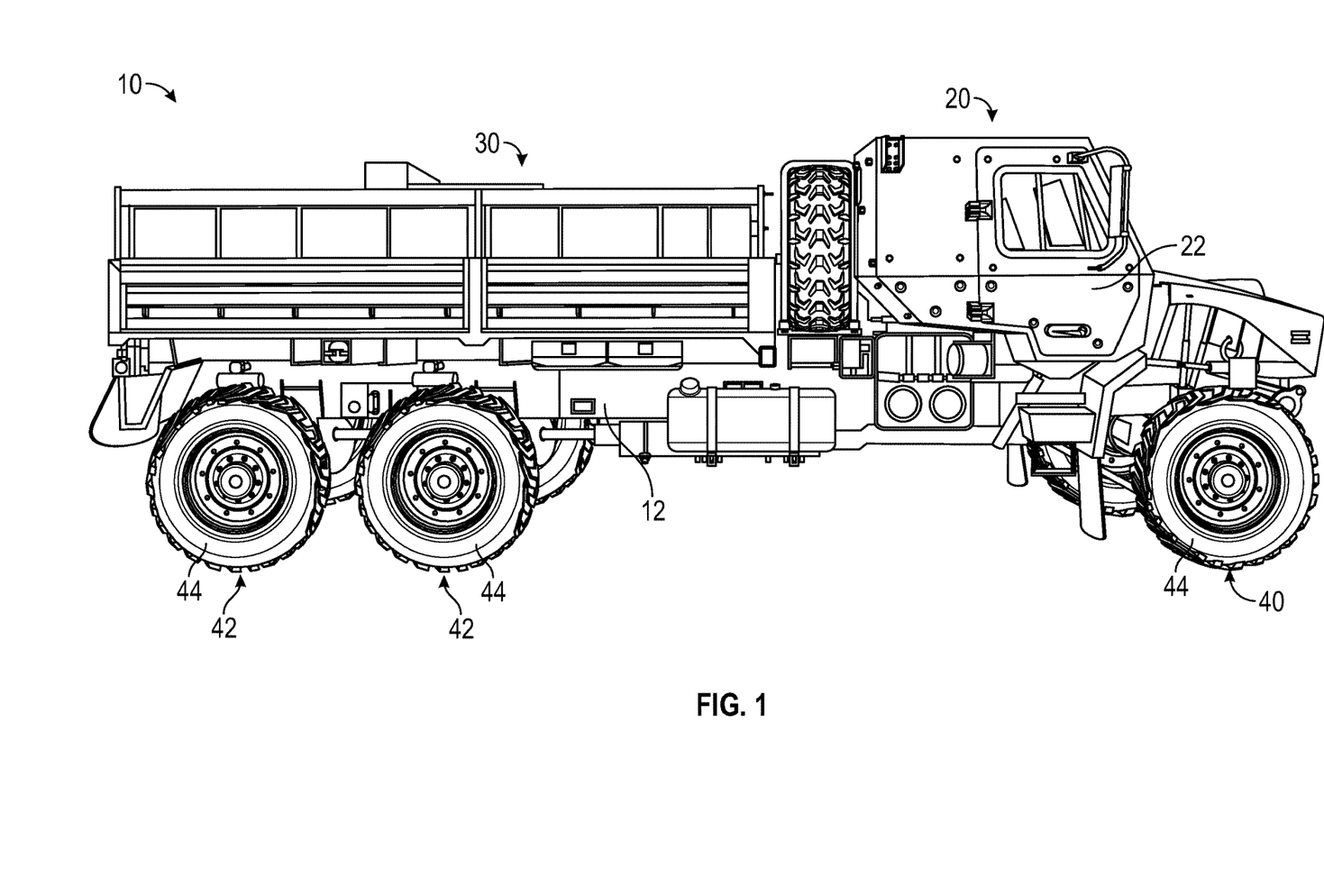
FIG. 1 is a side view of a vehicle, according to an exemplary embodiment.

According to the exemplary embodiment shown in FIG. 1, a vehicle, shown as vehicle 10, includes a chassis, shown as frame 12, that supports a body or body assembly including a first portion, shown as front cabin 20, and a second portion, shown as mission equipment 30. As shown in FIG. 1, the mission equipment 30 is disposed behind the front cabin 20. The frame 12 of the vehicle 10 engages a plurality of tractive assemblies, shown as front tractive assemblies 40 and rear tractive assemblies 42. According to an exemplary embodiment, the vehicle 10 is a military ground vehicle. In other embodiments, the vehicle 10 is an off-road vehicle such as a utility task vehicle, a recreational off-highway vehicle, an all-terrain vehicle, a sport utility vehicle, and/or still another vehicle. In yet other embodiments, the vehicle 10 is another type of off-road vehicle such as mining, construction, and/or farming equipment. In still other embodiments, the vehicle 10 is an aerial truck, a rescue truck, an aircraft rescue and firefighting (ARFF) truck, a concrete mixer truck, a refuse truck, a commercial truck, a tanker, an ambulance, and/or still another vehicle.

According to an exemplary embodiment, the frame 12 defines a longitudinal axis. The longitudinal axis may be generally aligned with a frame rail of the frame 12 of the vehicle 10 (e.g., front-to-back, etc.). In some embodiments, the vehicle 10 includes a plurality of front tractive assemblies 40 and/or a plurality of rear tractive assemblies 42 (e.g., one, two, etc.). The front tractive assemblies 40 and/or the rear tractive assemblies 42 may include brakes (e.g., disc brakes, drum brakes, air brakes, etc.), gear reductions, steering components, wheel hubs, wheels, tires, and/or other features. As shown in FIG. 1, the front tractive assemblies 40 and the rear tractive assemblies 42 each include tractive elements, shown as wheel and tire assemblies 44. In other embodiments, at least one of the front tractive assemblies 40 and the rear tractive assemblies 42 include a different type of tractive element (e.g., a track, etc.).

According to an exemplary embodiment, the front cabin 20 includes one or more doors, shown as doors 22, that facilitate entering and exiting an interior of the front cabin 20. The interior of the front cabin 20 may include a plurality of seats (e.g., two, three, four, five, etc.), vehicle controls, driving components (e.g., steering wheel, accelerator pedal, brake pedal, etc.), etc. According to the exemplary embodiment shown in FIG. 1, the mission equipment 30 includes a cargo body configured to facilitate transporting various military equipment (e.g., medical supplies, ammunition, weapons, missiles, personnel, etc.). In other embodiments, the mission equipment 30 includes a truck bed or a flat bed. In some embodiments, the mission equipment 30 additionally or alternatively includes a boom lift. In another embodiment, the mission equipment 30 includes an at least partially enclosed troop transport cabin configured to facilitate transporting troops (e.g., eight, ten, twelve, twenty, etc.) with the vehicle 10.

According to an exemplary embodiment, the vehicle 10 includes a powertrain system. The powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front tractive assemblies 40 and the rear tractive assemblies 42. In some embodiments, each of the front tractive assemblies 40 and/or the rear tractive assemblies 42 include an individual motive driver (e.g., a motor that is electrically coupled to the energy storage device, etc.) configured to facilitate independently driving each of the wheel and tire assemblies 44. In some embodiments, a transmission of the vehicle 10 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 44, etc.). The final drive may then propel or move the vehicle 10. In such embodiments, the vehicle 10 may not include the generator and/or the energy storage device. The powertrain of the vehicle 10 may thereby be a hybrid powertrain or a non-hybrid powertrain. According to an exemplary embodiment, the primary driver is a compression-ignition internal combustion engine that utilizes diesel fuel. In alternative embodiments, the primary driver is another type of device (e.g., spark-ignition engine, fuel cell, electric motor, etc.) that is otherwise powered (e.g., with gasoline, compressed natural gas, hydrogen, electricity, etc.).

Figure 2:
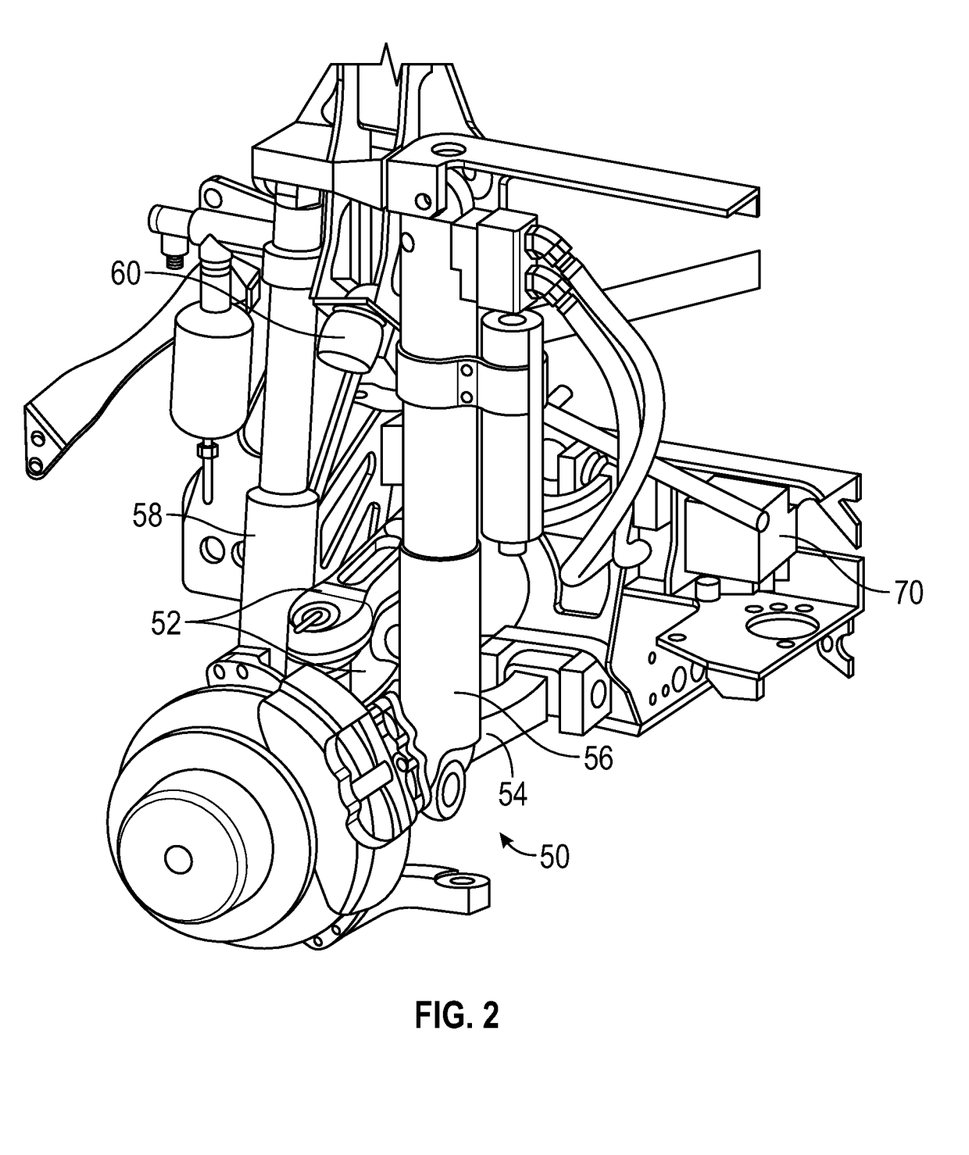
FIG. 2 is a perspective view of a tractive assembly of the vehicle of FIG. 1, according to an exemplary embodiment.

According to the exemplary embodiment shown in FIG. 2, the front tractive assemblies 40 and the rear tractive assemblies 42 include suspension assemblies 50. The wheel and tire assemblies 44 of the front tractive assemblies 40 and the rear tractive assemblies 42 are at least partially controlled (e.g., supported) by the suspension assemblies 50, which include an upper support arm 52, a lower support arm 54, a damper 56, and a spring 58. The suspension assemblies 50 couple the wheel and tire assemblies 44 to the frame 12. In some embodiments, the damper 56 and the spring 58 are integrated into one component. As the vehicle 10 travels over uneven terrain, the upper support arm 52 and the lower support arm 54 at least partially guide the movement of each wheel and tire assembly 44, and a stopper 60 provides an upper bound to movement of the wheel and tire assembly 44.

Referring to FIG. 2, according to an exemplary embodiment, the suspension assembly 50 includes one or more high-pressure gas components. The spring 58 may be a high-pressure gas spring 58. In some embodiments, the suspension system further includes at least one high-pressure gas source 70 (e.g., a pump, a high-pressure reservoir, an accumulator, etc.) configured to selectively provide gas, under pressure, to the high-pressure gas spring 58. In some such embodiments, the suspension assembly 50 includes separate high-pressure gas sources 70 associated with each high-pressure gas spring 58. In some embodiments, the suspension assembly 50 further includes at least one low-pressure gas sink (e.g., a pump, a low-pressure reservoir, an accumulator, etc.) configured to selectively remove gas from the high-pressure gas spring 58. In some embodiments, the high-pressure gas source 70 is a different configuration of the low-pressure gas sink (e.g., a pump configured to provide gas in one configuration and remove gas in a second configuration).

Figure 3:
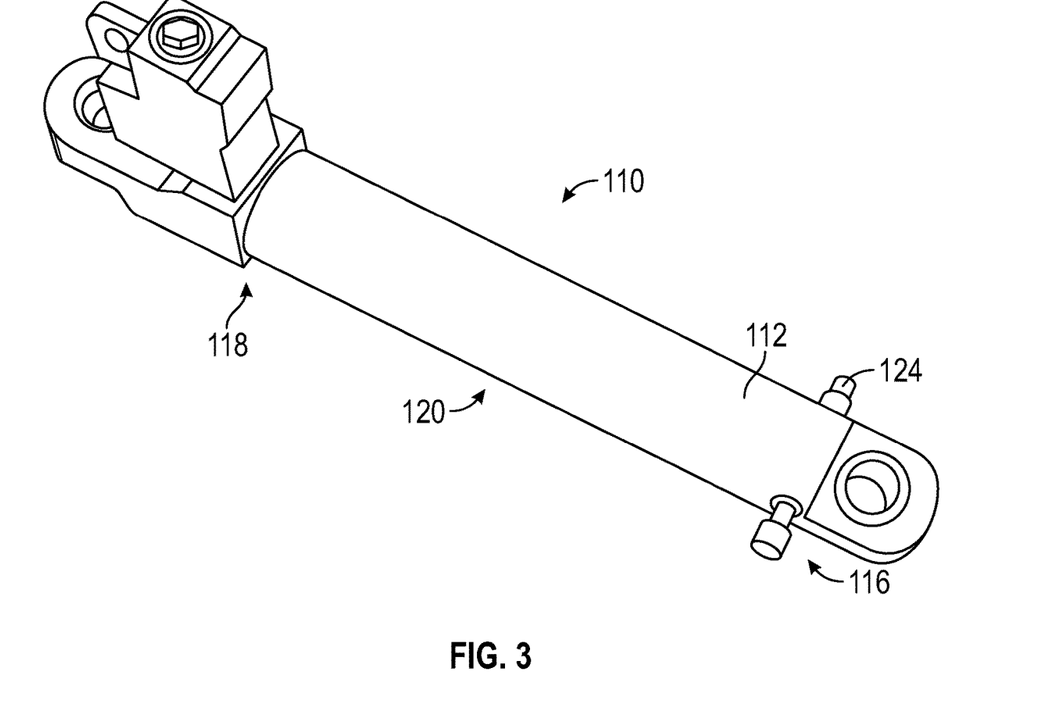
FIG. 3 is a perspective view of a gas spring of the tractive assembly of FIG. 2, according to an exemplary embodiment.
Figure 4:
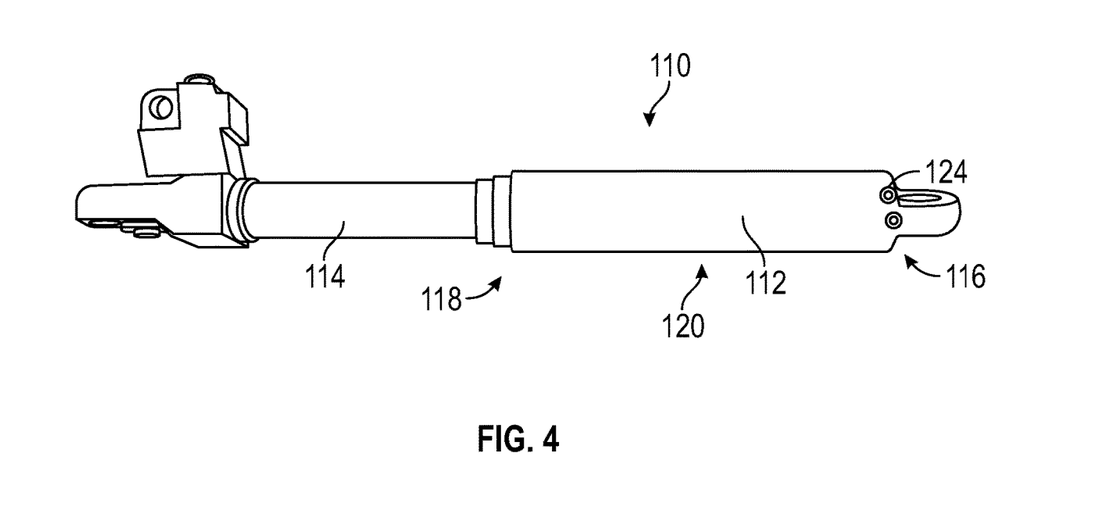
FIG. 4 is a top view of the gas spring of FIG. 3.

Referring to FIG. 3 and FIG. 4, gas spring 110 includes a single acting cylinder 112 coupled to a rod 114. The cylinder 112 has a cap end 116, a rod end 118, and a side wall 120 (e.g., a cylindrical side wall) extending between the cap end 116 and the rod end 118. A chamber is formed between the cylinder 112 and the rod 114. The chamber may be a space defined by the interior of the cylinder 312 surrounded by side wall 320 and between the cap end 316 and rod end 318. The rod 114 is configured to translate with respect to the cylinder 112. According to an exemplary embodiment, the rod 114 is coupled to or includes a piston that forms a wall of the chamber. When the rod 114 translates relative to the cylinder 112, the piston changes the volume of the chamber, compressing the gas in the chamber or facilitating expansion of the gas. The gas resists compression, providing a force that is a function of the compressibility of the gas, the area of the piston, the volume and geometry of the chamber, and the current state (e.g., initial pressure) of the gas, among other factors.

In some embodiments, the gas spring 110 includes at least one port 124 (e.g., aperture, inlet) that may be opened to facilitate providing gas (e.g., inert gas) to or from the chamber. The chamber of the gas spring is substantially sealed when the port 124 is not open. In some embodiments, the port 124 may be coupled to a high-pressure gas source, increasing the pressure in the gas spring 110 and extending the rod 114 from the cylinder 112. In some embodiments, the port 124 may be coupled to a low-pressure gas sink, decreasing the pressure in the chamber and facilitating retraction of the rod 114 into the cylinder 112.

Figure 5:
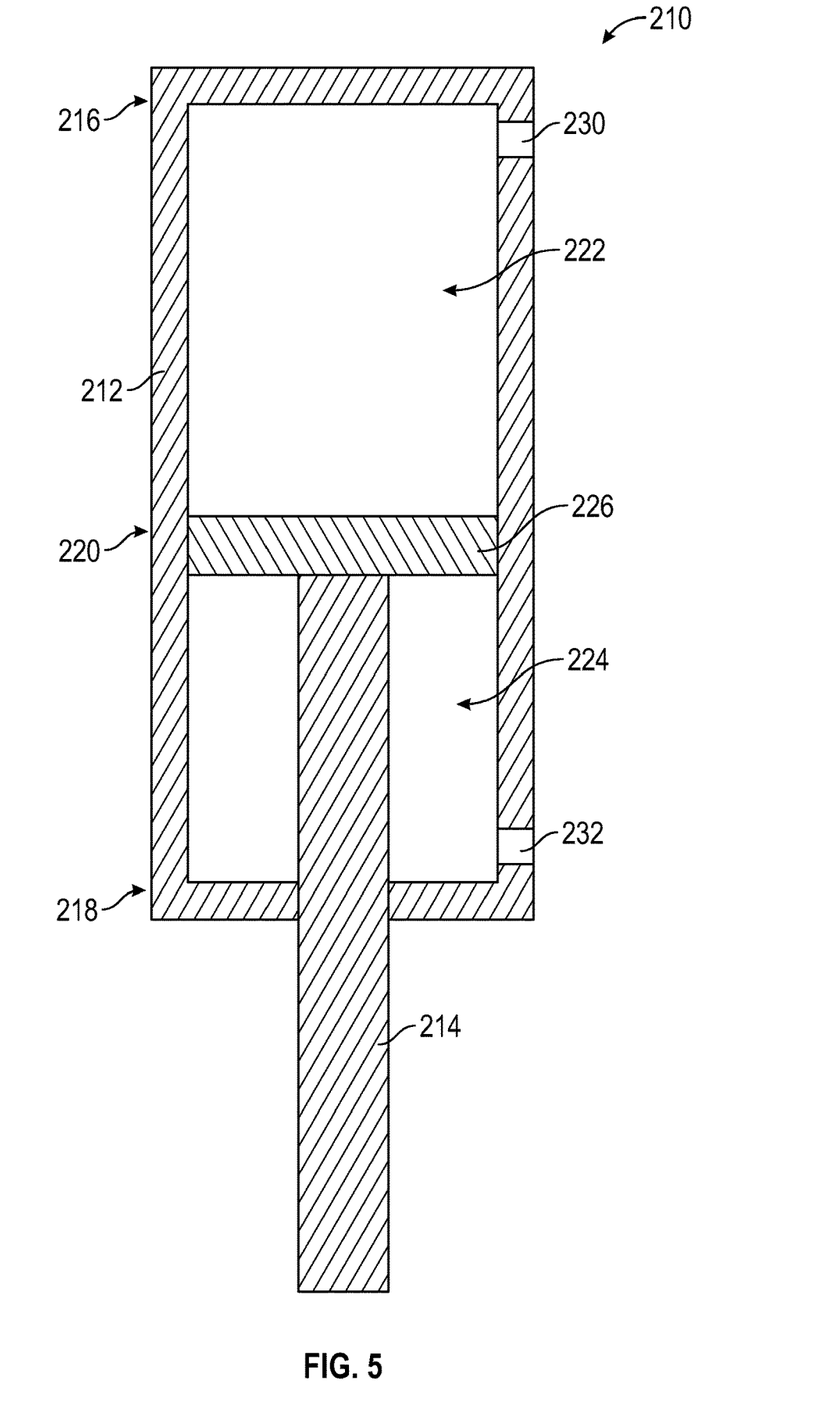
FIG. 5 is a schematic view of a gas spring of the tractive assembly of FIG. 3, according to an exemplary embodiment.

Referring to FIG. 5, a gas spring 210 includes a double acting cylinder 212 coupled to a rod 214. The cylinder 212 has a cap end 216, a rod end 218, and a side wall 220 extending between the cap end 216 and the rod end 218. An extension chamber 222 is formed between the cylinder and the rod. The extension chamber 222 may be interior to the cylinder 212, between the cap end 216, the side wall 220, and the rod 214, which extends through the rod end of the cylinder. A retraction chamber 224 is formed on the opposite side of the rod. The retraction chamber 224 may be interior to the cylinder 212, between the rod end 218, the side wall 220, and the rod 214. The rod 214 is configured to translate with respect to the cylinder 212. According to an exemplary embodiment, the rod 214 is coupled to or includes a piston 226 that forms a wall of the chamber. When the rod 214 translates relative to the cylinder 112, the piston 226 increases the volume of either the extension chamber 222 or the retraction chamber 224 and decreases the volume of the other chamber, compressing or expanding the gas in the extension chamber 222 and the retraction chamber 224. The gas in the chamber resists compression, providing a force that is a function of the compressibility of the gas, the area of the piston, the volume and geometry of the chamber, and the current state (e.g., initial pressure) of the gas, among other factors.

In some embodiments, the gas spring 210 includes at least one extension port 230 and at least one retraction port 232 that may be opened to facilitate providing gas to or from the extension chamber 222 and the retraction chamber 224, respectively. The extension chamber 222 and the retraction chamber 224 of the gas spring may be substantially sealed when the extension ports 230 and the retraction ports 232 are not open. In some embodiments, the extension ports 230 may be fluidly coupled to a high-pressure gas source, and the retraction ports 232 may be fluidly coupled to a low-pressure gas sink, creating a pressure differential across both sides of the piston 226. This pressure differential may force the rod 214 to extend from the cylinder 212. In some embodiments, the extension ports 230 may be coupled to a low-pressure gas sink, and the retraction ports 232 may be coupled to a high-pressure gas source to retract the rod 214 into the cylinder 212.

In still another embodiment, a gas spring 210 further includes at least one port that may be opened to facilitate providing hydraulic fluid (e.g., oil) to or from an internal volume of the gas spring. In such embodiments, adding or removing of hydraulic fluid from the internal volume changes the overall length of the gas spring for different ride heights of the suspension system. In such embodiments, the high-pressure sources and the low-pressure sinks are configured to provide and receive hydraulic fluid instead of pressurized gas.

Figure 6:
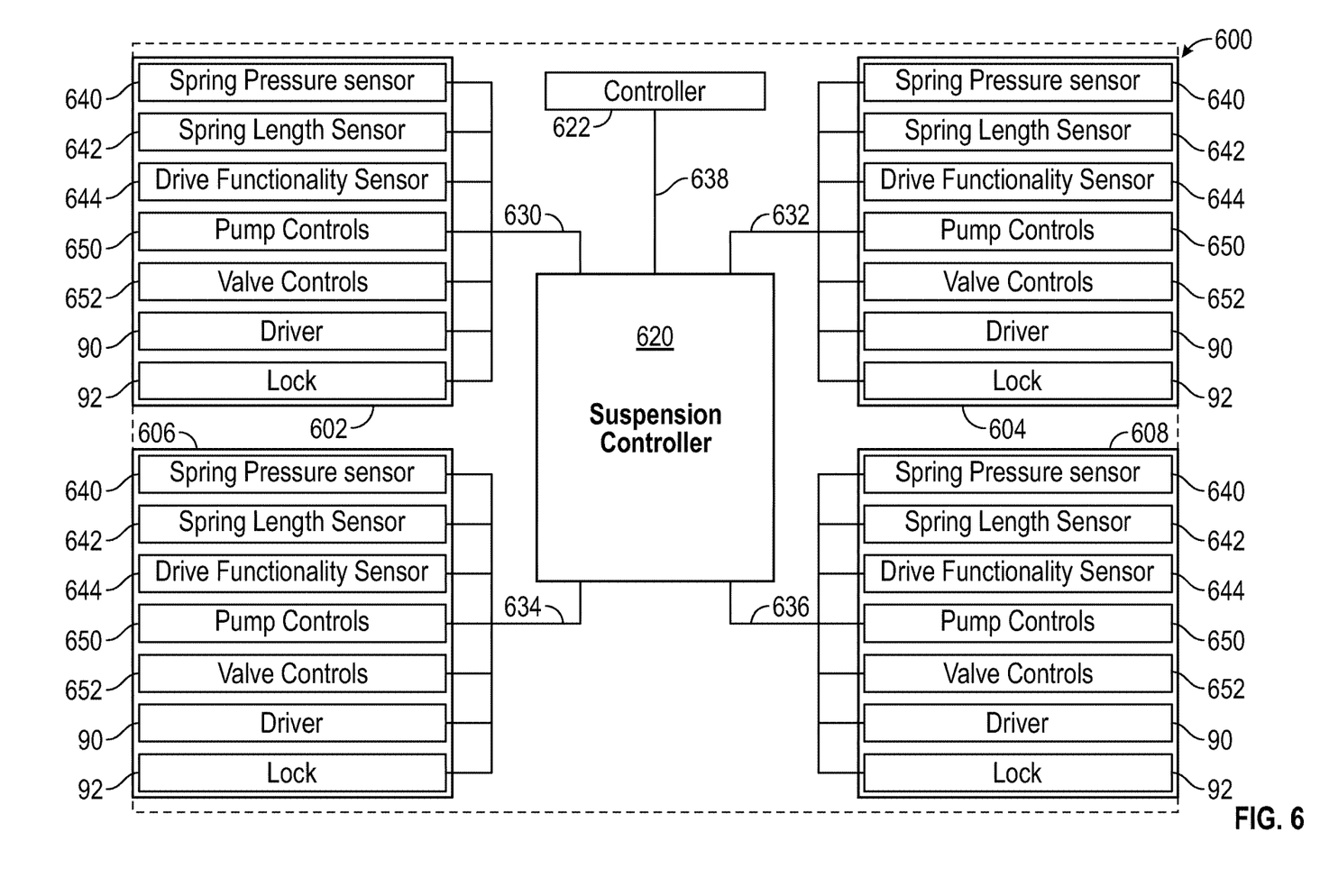
FIG. 6 is a schematic view of the vehicle of FIG. 1, according to an exemplary embodiment.

As shown in FIG. 6, the suspension assembly 50 further includes a driver 90. Driver 90 is configured to raise part or all of a front tractive assembly 40 or a rear tractive assembly 42 (e.g., the wheel and tire assembly 44, the upper support arm 52, the lower support arm 54, and the spring 58) such that the tractive assembly is no longer in contact with the support surface (e.g., the ground). Driver 90 may include a rotary actuator and/or a linear actuator. Driver 90 may include one or more of a hydraulic cylinder, a pneumatic cylinder, a rack and pinion assembly, a pulley and cable assembly, a lead screw assembly, an electric motor, and a linkage assembly. In some embodiments, the suspension assembly 50 further includes a lock, shown in FIG. 6 as lock 92. In some embodiments, driver 90 raises and holds a tractive assembly in place. In other embodiments, the driver 90 raises the tractive assembly, and the lock 92 holds the tractive assembly in place. Lock 92 may include one or more of a hydraulic cylinder, a pneumatic cylinder, an electric motor, a solenoid, a latch, a magnet, a pin, and a clamp. In some embodiments, the lock 92 is passively engaged once the rear tractive assembly 42 is raised past a threshold height. In some embodiments, the lock 92 can be actively engaged or disengaged (e.g., by applying a high-pressure gas, by applying an electrical current, etc.).

Referring now to FIG. 6, a detailed diagram of a vehicle suspension control system is shown, according to an exemplary embodiment. Vehicle 600 is shown to include suspension assemblies 602, 604, 606, and 608 coupled to each of the rear tractive assemblies 42. In some embodiments, the front tractive assemblies 40 also include suspension assemblies. In some embodiments, the suspension assemblies 602, 604, 606, and 608 include the gas spring 110. In other embodiments, the suspension assemblies 602, 604, 606, and 608 include the gas spring 210. In some embodiments, the suspension assemblies 602, 604, 606, and 608 further include driver 90 and lock 92. Suspension controller 620 communicates with suspension assemblies 602, 604, 606, and 608 through data lines 630, 632, 634, and 636, respectively. Suspension controller 620 also communicates with controller 622 (for instance, an engine control unit) through data line 638. Suspension controller 620 allows each suspension assembly to be controlled individually. Data lines 630, 632, 634, and 636 may be any type of communications medium capable of conveying electronic data between suspension controller 620 and suspension assemblies 602, 604, 606, and 608, and controller 622. Data lines 630, 632, 634, and 636 may be wired connections, wireless connections, or a combination of wired and wireless connections. In some embodiments, data lines 630, 632, 634, and 636 are redundant connections. For example, data line 630 may include two or more independent connections between suspension controller 620 and suspension assembly 602. In another example, data line 630 may include individual connections between suspension controller 620 and the sensors and controls of suspension assembly 602 (e.g., spring pressure sensor 640, valve controls 648, etc.).

Suspension assemblies 602, 604, 606, and 608 each include sensor and control equipment coupled to data lines 630, 632, 634, and 636. For example, suspension assembly 602 may have a spring pressure sensor 640, a spring length sensor 642, a drive functionality sensor 644, pump controls 650, valve controls 652, a driver 90, and a lock 92. Pump controls 650 control the operation of one or more pumps that provide pressurized gas to or from a gas spring in suspension assembly 602. Valve controls 652 control one or more valves that regulate gas flow between the one or more high-pressure gas sources, the one or more low-pressure sinks, and the gas springs. The actuation of driver 90 and lock 92 are controlled by suspension controller 620. Driver 90 and lock 92 may be controlled either directly (e.g., the suspension controller 620 communicates with the driver 90 and lock 92 through data line 630) or indirectly (e.g., the suspension controller 620 controls a valve that controls the flow of hydraulic fluid to the driver 90). Spring pressure sensor 640 measures the pressure or pressures in the gas spring of suspension assembly 602 and provides the measured data to suspension controller 620 with data line 630. Spring length sensor 642 measures the current length of the gas spring in suspension assembly 602. Drive functionality sensor 644 measures parameters of the tractive assembly coupled to the suspension assembly 602. The drive functionality sensor 644 generates data corresponding to the functionality of the tractive assembly, and is used to determine if the tractive assembly is functioning properly. The drive functionality sensor 644 provides the generated data to suspension controller 620 with data line 630. In some embodiments, the drive functionality sensor 644 measures the pressure in the tire coupled to the tractive assembly. In other embodiments, suspension assemblies 602, 604, 606, and 608 may include any number of sensors and controls. For example, drive functionality sensor 644 may include two or more pressure sensors to provide redundancy for the suspension system in vehicle 600.

Figure 7:
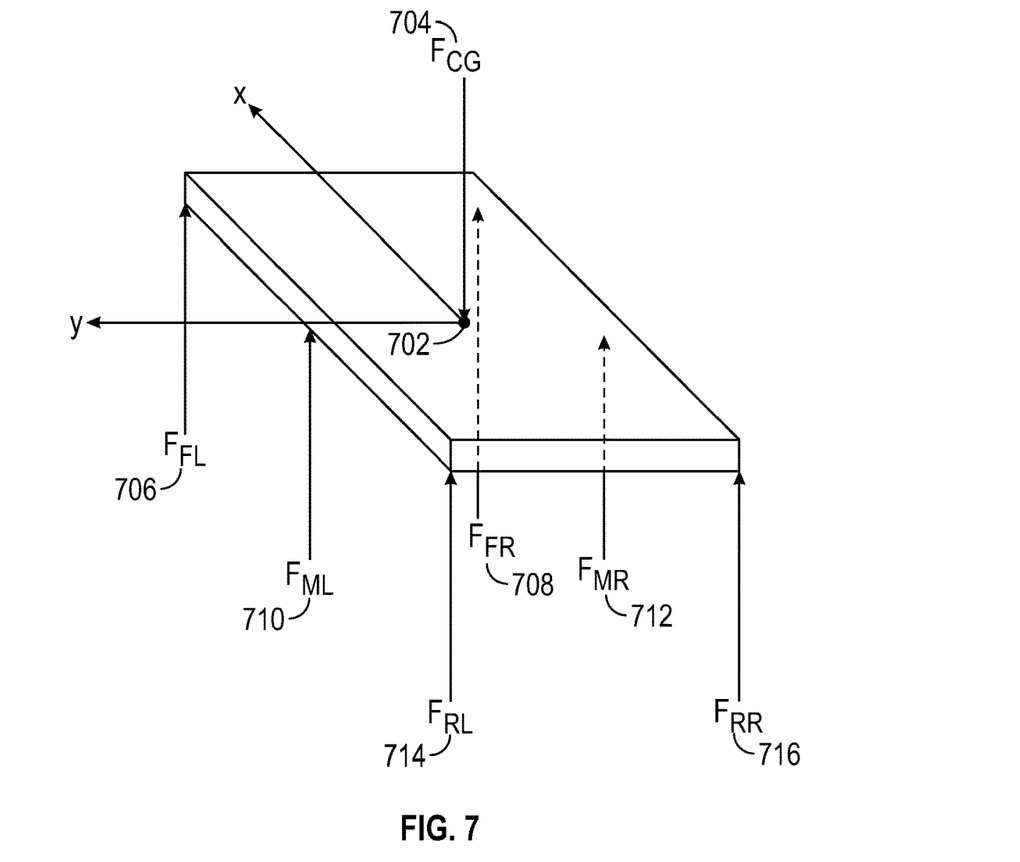
FIG. 7 is a force diagram of the vehicle of FIG. 1, according to an exemplary embodiment.

Referring now to FIG. 7, a force diagram of the vehicle suspension system of vehicle 600 is shown, according to an exemplary embodiment. The wheels of vehicle 600 experience resistance forces $F_{FL}$ 706, $F_{FR}$ 708, $F_{ML}$ 710, $F_{MR}$ 712, $F_{RL}$ 714, and $F_{RR}$ 716 from the ground, which correspond to the front left, front right, middle left, middle right, rear left, and rear right tires, respectively. Vehicle 600 is also shown to have a center of mass (e.g., center of gravity), shown as center of mass 702, which also provides downward force $F_{CG}$ 704.

In some situations, a vehicle may experience a disabling event that prevents normal operation of a tractive assembly of the vehicle. By way of example, a blast event (e.g., caused by an explosive device) may cause a tire to lose pressure or become partially or completely decoupled from the vehicle. If powered movement is continued after a disabling event without adjustment to the suspension of the vehicle, the vehicle may experience a partial or total loss of stability that prevents further powered movement of the vehicle. The vehicle 600 utilizes a limp home system 800, illustrated in FIG. 8, to improve stability after a disabling event. The limp home system 800 removes the disabled tractive assembly from contact with the support surface (e.g., the ground) and adjusts the pressures in the remaining gas springs to redistribute the load of the vehicle 600 among the remaining functional tractive assemblies. In some embodiments, in step 802, the suspension controller 620 is configured to monitor the drive functionality sensor 644 and determine if any of the rear tractive assemblies 42 are not operating normally. By way of example, the drive functionality sensor 644 may be configured to measure a tire pressure of the wheel and tire assembly 44. If the tire pressure drops below a threshold value (e.g., 30 psi, 10 psi, etc.), then a disabling event may have occurred. In response to such an indication, the disabled tractive assembly is removed from contact with the support surface in step 804.

Figure 8:
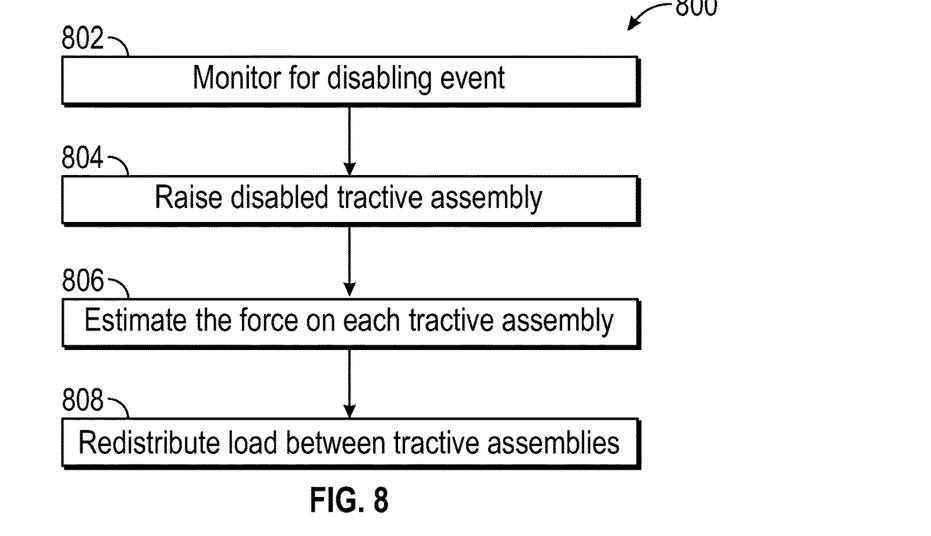
FIG. 8 is flow diagram of a limp home system, according to an exemplary embodiment.

In some embodiments, the suspension assemblies include a gas spring with a single acting cylinder (e.g., the gas spring 110). In step 804, the suspension controller 620 is configured to fluidly couple the chamber of the gas spring 110 of the disabled tractive assembly to the low-pressure gas sink, reducing the force on the gas spring 110. Such coupling may be provided by pump controls 650 and/or valve controls 652. The driver 90 is activated by suspension controller 620, which raises the disabled tractive assembly from contact with the ground. In some embodiments, the driver 90 secures the tractive assembly in place after it is raised. In other embodiments, the suspension controller is configured to activate the lock 92 in order to mechanically secure the tractive assembly in place.

In some embodiments, the suspension assemblies include a gas spring with a single acting cylinder (e.g., the gas spring 110). In step 804, the suspension controller 620 may be configured to additionally or alternately fluidly couple the chambers of the gas springs 110 of the functional tractive assemblies to the high-pressure gas source 70, increasing the length of those gas springs. This raises the frame 12, and the disabled track assembly is raised from contact with the ground. In some embodiments, the suspension controller 620 is configured to not change the volume of gas in the gas spring of the disabled tractive assembly.

In some embodiments, the suspension assemblies include a gas spring with a double acting cylinder (e.g., the gas spring 210). In step 804, the suspension controller 620 may be configured to fluidly couple the retraction chamber 224 of the gas spring 210 of the disabled tractive assembly to the high-pressure gas source 70 and the extension chamber 222 of the gas spring 210 of the disabled tractive assembly to the low-pressure gas sink. The resultant pressure differential on the rod 214 causes the gas spring 210 to retract and raise the disabled tractive assembly. In some such embodiments, the gas spring 210 holds the disabled track assembly in the raised position, and the lock 92 is omitted.

In some embodiments, the limp home system optionally includes a step 806 where the force supported by each remaining tractive assembly is estimated. Referring again to FIG. 7, the forces $F_{FL}$ 706, $F_{FR}$ 708, $F_{ML}$ 710, $F_{MR}$ 712, $F_{RL}$ 714, and $F_{RR}$ 716 are calculated using the pressure measured in by the spring pressure sensor 640 in each suspension assembly. An assumption may be made that the vehicle spring mass is only supported by gas pressure. This assumption may not apply when the spring is at a travel range limit (e.g., the spring is fully compressed or fully extended). Additionally, an assumption may be made that the force supported by the disabled tractive assembly is negligible.

In step 808, the load on the individual tractive assemblies is redistributed. The suspension controller 620 is configured to selectively fluidly couple the gas springs to either the high-pressure gas source 70 or the low-pressure gas sink to vary the volume of gas in the chambers of the springs using one or both of the pump controls 650 and the valve controls 652. The suspension controller 620 determines if gas should be added or removed from each gas spring using feedback from the various sensors in the tractive assemblies (e.g., the spring pressure sensor 640, the spring length sensor 642). By way of example, the suspension controller 620 may be configured to provide control and actuation until the gas springs reach a target length. By way of another example, the suspension controller may be configured to provide control and actuation until the gas springs reach a target force supported.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A vehicle, comprising:
   a frame;
   a first tractive assembly coupled to the frame, the first tractive assembly comprising
      a first tractive element configured to support a portion of the weight of the vehicle on a support surface, and
      a first actuator operatively connected to the first tractive element and configured to control a distance of the first tractive element to the frame;
   a second tractive assembly coupled to the frame, the second tractive assembly comprising
      a second tractive element configured to contact the support surface, and
      a second actuator operatively connected to the second tractive element and configured to control a distance of the first tractive element to the frame;
   a primary driver configured to provide energy to drive the first tractive element and second tractive element to propel the vehicle; and
   a controller operatively connected to the first actuator and the second actuator, the controller executing instructions stored on memory to:
      determine that the second tractive element is not functioning properly; and
      responsive to the determination that the second tractive element is not functioning properly, generate one or more control signals for at least one of the first actuator and the second actuator to raise the second tractive element with respect to the first tractive element and thereby effectively raise the second tractive element from the support surface.

2. The vehicle of claim 1, wherein the controller further executes instructions stored on memory to perform the following responsive to generation of the one or more control signals:
estimate a force on the first tractive element and a force on each of at least three other tractive elements; and
redistribute a load among the first tractive element and the at least three other tractive elements in accordance with the estimated forces.

3. The vehicle of claim 1, further comprising:
a sensor generating data corresponding to a pressure associated with the second tractive element.

4. The vehicle of claim 3, wherein the controller raises the second tractive element with respect to the first tractive element responsive to the pressure not exceeding a threshold pressure.

5. The vehicle of claim 1, wherein the controller raises the second tractive element with respect to the first tractive element by lengthening the first actuator to cause the frame to be elevated with respect to the support surface while maintaining the length of the second actuator.

6. The vehicle of claim 1, wherein the controller raises the second tractive element with respect to the first tractive element by shortening the second actuator while maintaining the length of the first actuator, whereby a distance between the frame and the support surface is maintained.

7. The vehicle of claim 1, wherein the first tractive assembly comprises:
a first lock operatively connected to the first actuator;
wherein the second tractive assembly comprises:
a second lock operatively connected to the second actuator, and wherein the controller is operatively connected to the first lock and second lock and executes instructions stored on memory to:
generate one or more control signals to actuate at least one of the first lock and second lock and thereby fix the relative position of the first tractive assembly with respect to the second tractive assembly.

8. The vehicle of claim 1, wherein the first actuator and the second actuator are gas springs in a suspension system for the vehicle.

9. A tractive assembly for a vehicle, the tractive assembly comprising:
a tractive element configured to support a portion of the weight of the vehicle on a support surface, the tractive element operatively connected to and configured to receive energy from a primary driver of the vehicle and thereby propel the vehicle;
a sensor arranged to generate data corresponding to the functionality of the tractive element; and
an actuator operatively connected to the first tractive element and configured to control a distance of the first tractive element to a frame of the vehicle, whereby the actuator causes the tractive element to be effectively raised from the support surface responsive to the sensor generating data indicative of the tractive element not functioning properly.

10. The tractive assembly of claim 9, wherein the sensor generates data corresponding to a pressure associated with the tractive element, and wherein the actuator is controlled to cause the tractive element to be effectively raised from the support surface responsive to the pressure not exceeding a threshold pressure.

11. The tractive assembly of claim 9, wherein the actuator causes the tractive element to be effectively raised from the support surface by shortening the distance of the tractive element to the frame of the vehicle.

12. The tractive assembly of claim 9, wherein the actuator causes the tractive element to be effectively raised from the support surface by maintaining the distance of the tractive element to the frame of the vehicle while actuators in one or more other tractive assemblies lengthen the distance between the frame of the vehicle and the support surface.

13. The tractive assembly of claim 9, further comprising:
a lock operatively connected to the first actuator and configured to be actuated to thereby fix the relative position of the tractive assembly with respect to the frame.

14. A method of controlling one or more tractive assemblies of a vehicle responsive to a disabling event, the method comprising:
receiving data from a sensor arranged to detect one or more conditions of a tractive element indicative of the functionality of the tractive element, the tractive element being coupled to a frame of the vehicle and configured to support a portion of the weight of the vehicle;
determining, based on the received data, that the tractive element is not functioning properly;
responsive to determining the tractive element is not functioning properly, generating one or more control signals for an actuator arranged to control a distance between the tractive element and the frame, the one or more control signals causing the tractive element to be effectively raised from a support surface for the vehicle.

15. The method of claim 14, wherein the tractive element is a first tractive element of a plurality of tractive elements, and wherein the method further comprise:
estimating forces on each of the plurality of tractive elements while the first tractive element is effectively raised from the support surface; and
redistributing a load on each of the plurality of tractive elements in accordance with the estimated forces.

16. The method of claim 14, wherein determining that the tractive element is not functioning properly comprises determining, based on a pressure in the in the tractive element, that the pressure is not exceeding a threshold pressure.

17. The method of claim 14, wherein the tractive element is a first tractive element, wherein the frame further includes a second tractive element coupled thereto, and wherein generating one or more control signals for the actuator comprises generating one or more control signals for the actuator to cause the first tractive element to be have a smaller distance to the frame than the second tractive element.

18. The method of claim 14, wherein the tractive element is a first tractive element and the actuator is a first actuator, wherein the frame further includes a second tractive element coupled thereto and a second actuator for controlling a distance between the second tractive element and the frame, and wherein generating one or more control signals for the actuator comprises generating one or more control signals for the second actuator to cause the second tractive element to be have a greater distance to the frame than the second tractive element.

19. The method of claim 14, wherein the actuator is a gas spring in a suspension system for the vehicle.

20. The method of claim 14, further comprising:
generating one or more control signals to actuate a lock and thereby fix the relative position of the tractive assembly with respect to the frame.

* * * * *